United States Patent
Obrecht

(10) Patent No.: US 8,630,488 B2
(45) Date of Patent: Jan. 14, 2014

(54) CREATING A DUOTONE COLOR EFFECT USING AN ICC PROFILE

(75) Inventor: Douglas Walter Obrecht, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 113 days.

(21) Appl. No.: 13/308,393

(22) Filed: Nov. 30, 2011

(65) Prior Publication Data

US 2013/0136344 A1    May 30, 2013

(51) Int. Cl.
    *G06K 9/00*    (2006.01)
(52) U.S. Cl.
    USPC ............................ 382/167; 382/162; 382/274
(58) Field of Classification Search
    USPC .......... 382/167, 162, 169, 274; 347/232, 240; 358/518, 521, 1.9, 1.1, 1.15; 345/619
    See application file for complete search history.

(56) References Cited

U.S. PATENT DOCUMENTS

| | | | | |
|---|---|---|---|---|
| 6,888,964 B2 * | 5/2005 | Schluter et al. | ............... | 382/167 |
| 7,324,702 B2 * | 1/2008 | Takano et al. | ................. | 382/274 |
| 7,652,794 B2 * | 1/2010 | Lee | .............................. | 358/3.26 |
| 7,944,585 B2 * | 5/2011 | Chang | ............................ | 358/1.9 |
| 2006/0072129 A1 | 4/2006 | Herron | | |

\* cited by examiner

*Primary Examiner* — Anh Do
(74) *Attorney, Agent, or Firm* — Osha Liang LLP

(57) ABSTRACT

A method for creating a duotone color effect from a lightest color and a darkest color, including: obtaining a source image in a red-green-blue (RGB) color space; obtaining a lightest color RGB tuple and a darkest color RGB tuple; generating an international color consortium (ICC) device link profile based on the lightest color RGB tuple and the darkest color RGB tuple; and converting the source image in RGB color space to a duotone image in RGB color space using a color conversion function with the ICC device link profile.

20 Claims, 4 Drawing Sheets

CREATING A DUOTONE COLOR EFFECT USING AN ICC PROFILE

CROSS-REFERENCE TO RELATED APPLICATIONS

The present application contains subject matter that may be related to the subject matter in U.S. patent application Ser. No. 13/308,397; filed on Nov. 30, 2011; and entitled: "CREATING A LUMINANCE EFFECT USING AN ICC PROFILE".

BACKGROUND

Color conversion algorithms are used to convert images in one color space to another color space. These algorithms are extensively used across the graphics and image processing industries and are typically very fast to execute. Color effects algorithms, such as luminance control, duotones, and HSL adjustments, are normally more complex than color conversion algorithms, and typically require more computational power to execute than color conversion algorithms. In other words, when color effects algorithms are performed on large images, performance of a system may be negatively affected. Despite the reduction in performance, users still want to apply color effects to images.

SUMMARY

In general, in one aspect, the invention relates to a method for creating a duotone color effect from a lightest color and a darkest color. The method comprises: obtaining a source image in a red-green-blue (RGB) color space; obtaining a lightest color RGB tuple and a darkest color RGB tuple; generating an international color consortium (ICC) device link profile based on the lightest color RGB tuple and the darkest color RGB tuple; and converting the source image in RGB color space to a duotone image in RGB color space using a color conversion function with the ICC device link profile.

In general, in one aspect, the invention relates to a non-transitory computer readable medium (CRM) storing instructions for creating a duotone color effect from a lightest color and a darkest color. The instructions comprise functionality for: obtaining a source image in a red-green-blue (RGB) color space; obtaining a lightest color RGB tuple and a darkest color RGB tuple; generating an international color consortium (ICC) device link profile based on the lightest color RGB tuple and the darkest color RGB tuple; and converting the source image in RGB color space to a duotone image in RGB color space using a color conversion function with the ICC device link profile.

In general, in one aspect, the invention relates to a system for creating a duotone color effect from a lightest color red-green-blue (RGB) tuple and a darkest color RGB tuple. The system comprises: a processor; a buffer for storing a portion of a source image in a RGB color space; a color profile module executing on the processor and configured to generate an international color consortium (ICC) device link profile based on the lightest color RGB tuple and the darkest color RGB tuple; and a conversion engine executing on the processor and comprising a color converter configured to convert the portion in the buffer to a duotone image in RGB color space using a color effects transform generated from the ICC device link profile.

Other aspects of the invention will be apparent from the following description and the appended claims.

DETAILED DESCRIPTION

Figure 1:
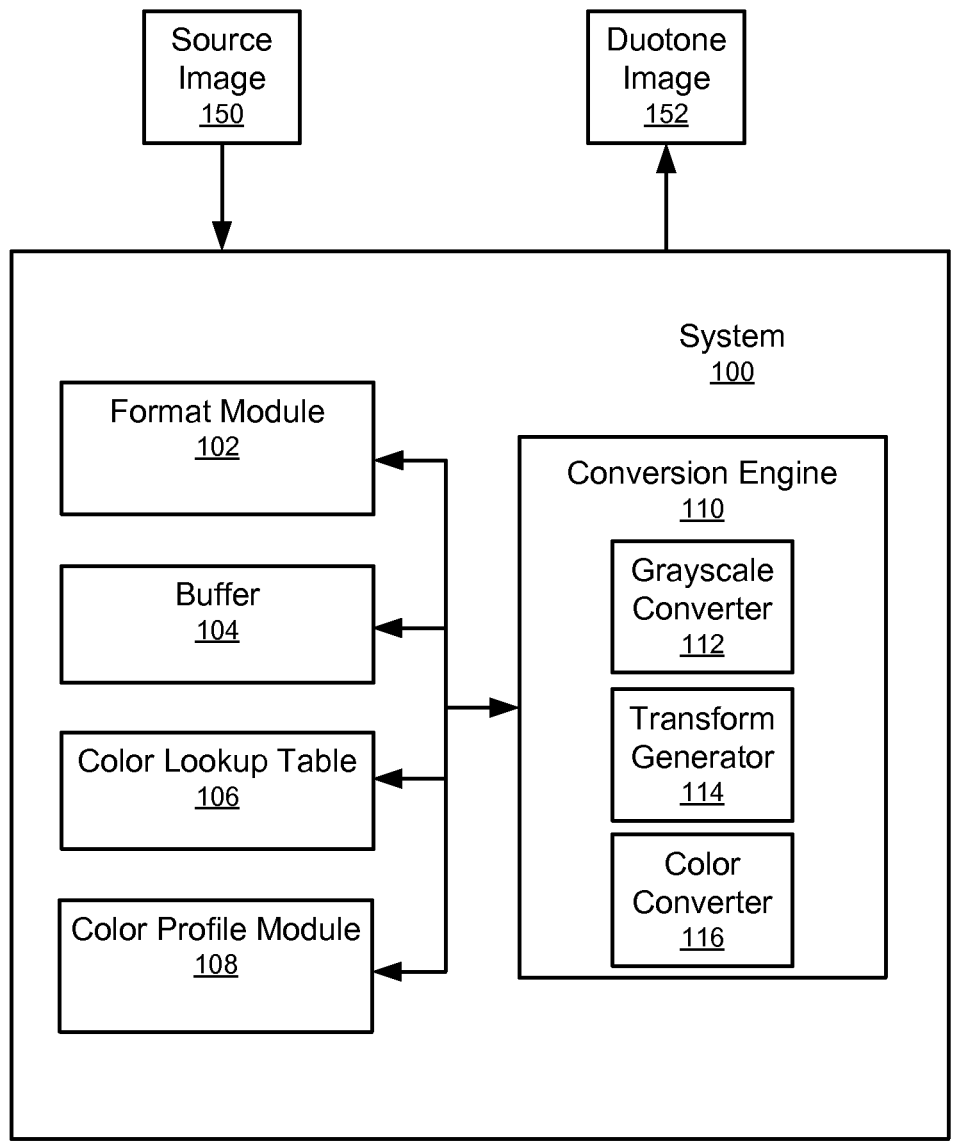
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for creating a duotone color effect on an RGB source image using an International Color Consortium (ICC) device link profile. Specifically, after the user selects the lightest color and the darkest color for the duotone color effect, the RGB tuples of the lightest color and the darkest color are used to define an RGB cube. The ICC device link profile is created based on the corners of the RGB cube. The ICC device link profile and the grayscale version of the RGB source image are inputted into a color conversion algorithm. The output of the color conversion algorithm is a RGB duotone version of the source image (i.e., a RGB duotone image).

FIG. 1 shows a system (100) in accordance with one or more embodiments of the invention. As shown in FIG. 1, the system (100) has multiple components including a conversion engine (110), a format module (102), a buffer (104), a color lookup table (106), and a color profile module (108). These components may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. The system (100) may input at least the source image (150) and output at least the duotone image (152).

The RGB color space adds together red, green, and blue light in various ways to reproduce a broad array of colors. A color in the RGB color space is described by indicating how much of each of red, green, and blue is included. The color is expressed as an RGB tuple (R, G, B), each component of which can vary from zero to a defined maximum value. If all the components are at zero the result is black. If all are at maximum, the result is the brightest representable white.

RGB tuple ranges may be quantified in various ways. Each component can be represented by values from 0 to 1, with any fractional value in between. This representation is used in theoretical analyses, and in systems that use floating-point representations. Each color component value can also be written as a percentage, from 0% to 100%. In computing, the component values are often stored as integer numbers in the range 0 to 255, the range that a single 8-bit byte can offer (i.e. by encoding 256 distinct values). These may be represented as either decimal or hexadecimal numbers. High-end digital image equipment can deal with the integer range 0 to 65,535 for each primary color, by employing 16-bit words instead of 8-bit bytes.

A duotone consists of combining two independent colors, such as black and blue. The two colors are assigned a value along a gray scale tone curve so that a particular gray value in an image is assigned a color as a combination of the two colors. The lighter color, such as blue, will be assigned to the white portion of the gray tone scale, while the darkest color, such as black, will be assigned to the black portion of the gray tone scale. Another example of a duotone uses white as the lightest color, and blue for the darkest color. The most commonly used colors are blue, yellow, browns and reds.

In one or more embodiments of the invention, the format module (102) is configured to convert the source image (150) from an arbitrary color space to the RGB color space. The arbitrary color space refers to any other color space beyond the RGB color space. Examples of other color spaces include Tristimulus, CIE XYZ, CMYK, and CIELab. The format module (102) may also be configured to convert the duotone image (152) from the RGB color space to an arbitrary color space (e.g., CMYK, CIE XYZ, etc.).

In one or more embodiments of the invention, the buffer (104) is configured to store a portion of the source image (150). The portion may be, for instance, a line of the source image (i.e. a set of contiguous pixels). The portion may be used to generate the duotone image (152). In other words, the source image (150) may be converted to the duotone image (152) on a line-by-line basis. Those skilled in the art will appreciate that the buffer (104) may obtain the portion from other entities beyond the source image (150), and may perform other functions beyond those disclosed.

As discussed above, colors in the RGB space are defined by three components (R, G, B). Accordingly, RGB tuples may be plotted by treating the RGB component values as ordinary Cartesian coordinates in a Euclidean space. In one or more embodiments of the invention, a RGB cube may be defined based on the lightest color RGB tuple and the darkest color RGB tuple selected by the user for the duotone effect. Specifically, the darkest color RGB tuple and the lightest color RGB tuple may define two corners of the RGB cube separated by the space diagonal of the RGB cube.

In one or more embodiments of the invention, the color lookup table (106) is configured to store entries corresponding to the corners of an RGB cube. For example, assume (r1, g1, b1) is the lightest color RGB tuple and (r0, g0, b0) is the darkest color RGB tuple. The color lookup table (106) may include the following data points: lutTable[0]=r0; lutTable[1]=g0; lutTable[2]=b0; lutTable[3]=r0; lutTable[4]=g0; lutTable[5]=b1; lutTable[6]=r0; lutTable[7]=g1; lutTable[8]=b0; lutTable[9]=r0; lutTable[10]=g1; lutTable[11]=b1; lutTable[12]=r1; lutTable[13]=g0; lutTable[14]=b0; lutTable[15]=r1; lutTable[16]=g0; lutTable[17]=b1; lutTable[18]=r1; lutTable[19]=g1; lutTable[20]=b0; lutTable[21]=r1; lutTable[22]=g1; lutTable[23]=b1. The color lookup table (106) may contain 8 entries of 3 bytes apiece, one point for each corner of the RGB cube.

In one or more embodiments of the invention, the color profile module (108) is configured to generate an International Color Consortium (ICC) device link profile based on a lightest color RGB tuple and a darkest color RGB tuple. Specifically, the color profile module (108) is configured to generate the ICC device link profile based on the color lookup table (106), which comprises entries corresponding to the corners of the RGB cube defined by the lightest color RGB tuple and the darkest color RGB tuple. A device link profile is a special kind of ICC profile that converts the color space of the input device directly into the color space of the output device, whereby the output device can be either a physical printer or a file format. Unlike ordinary source or destination profiles, ICC device link profiles do not describe a specific color space, but define the conversion from a source color space to a destination color space. The basis for creating a device link profile is, therefore, always an ordinary ICC profile. In one or more embodiments of the invention, the source color space and the destination color space are both the RGB color space.

In one or more embodiments of the invention, the grayscale converter (112) is configured to calculate a grayscale value for each pixel of the portion of the source image (150) in the buffer (104). In one or more embodiments of the invention, the grayscale value (Y) is calculated using the following: Y=(0.3*R)+(0.59*G)+(0.11*B), where R, G, and B correspond to the red, green, and blue components, respectively, of the pixel. Once the grayscale value is calculated, the conversion engine (110) may set the R, G, and B components of the pixel to the grayscale value. In other words, the RGB tuple defining the pixel may be set to (Y,Y,Y). Those skilled in the art, having the benefit of this detailed description, will appreciate that any algorithm may be used to calculated the grayscale value (i.e., Y).

In one or more embodiments of the invention, a transform generator (114) is configured to generate a color effects transform from the ICC device link profile. The ICC device link profile is a file format, whereas the color effects transform is the internal representation of the ICC device link profile, which contains most of the data within the ICC device link profile as well as other information that is required by the color conversion function/algorithm.

In one or more embodiments of the invention, the color effects transform maps a grayscale value to a duotone RGB tuple interpolated from the lightest color RGB tuple and the darkest color RGB tuple. In other words, the color effects transform maps a pixel's RGB grayscale tuple (Y,Y,Y) to an interpolated duotone RGB tuple (R', G', B'). For example, the duotone RGB tuple may be a weighted average of the lightest color RGB tuple and the darkest color RGB tuple, where the weights are based on the grayscale value. Those skilled in the art, having the benefit of this detailed description, will appreciate that there exists many algorithms to interpolate the duotone RGB tuple (R', G', B') based on the input grayscale value and the RGB tuples of the lightest and darkest colors. The conversion engine (110) is configured to set the red component, the green component, and the blue component of the pixel to R', G', and B', respectively.

In one or more embodiments of the invention, a color converter (116) is configured to convert the portion of the source image (150) in the buffer (104) to a duotone image (152) in RGB color space using a color effects transform generated from the ICC device link profile. The color converter (116) may obtain the color effects transform from the transform generator (114). Moreover, the color converter (116) may invoke a color conversion algorithm to create the duotone image (152). Those skilled in the art will appreciate that the color converter (116) may perform other functions beyond those disclosed.

Figure 2:
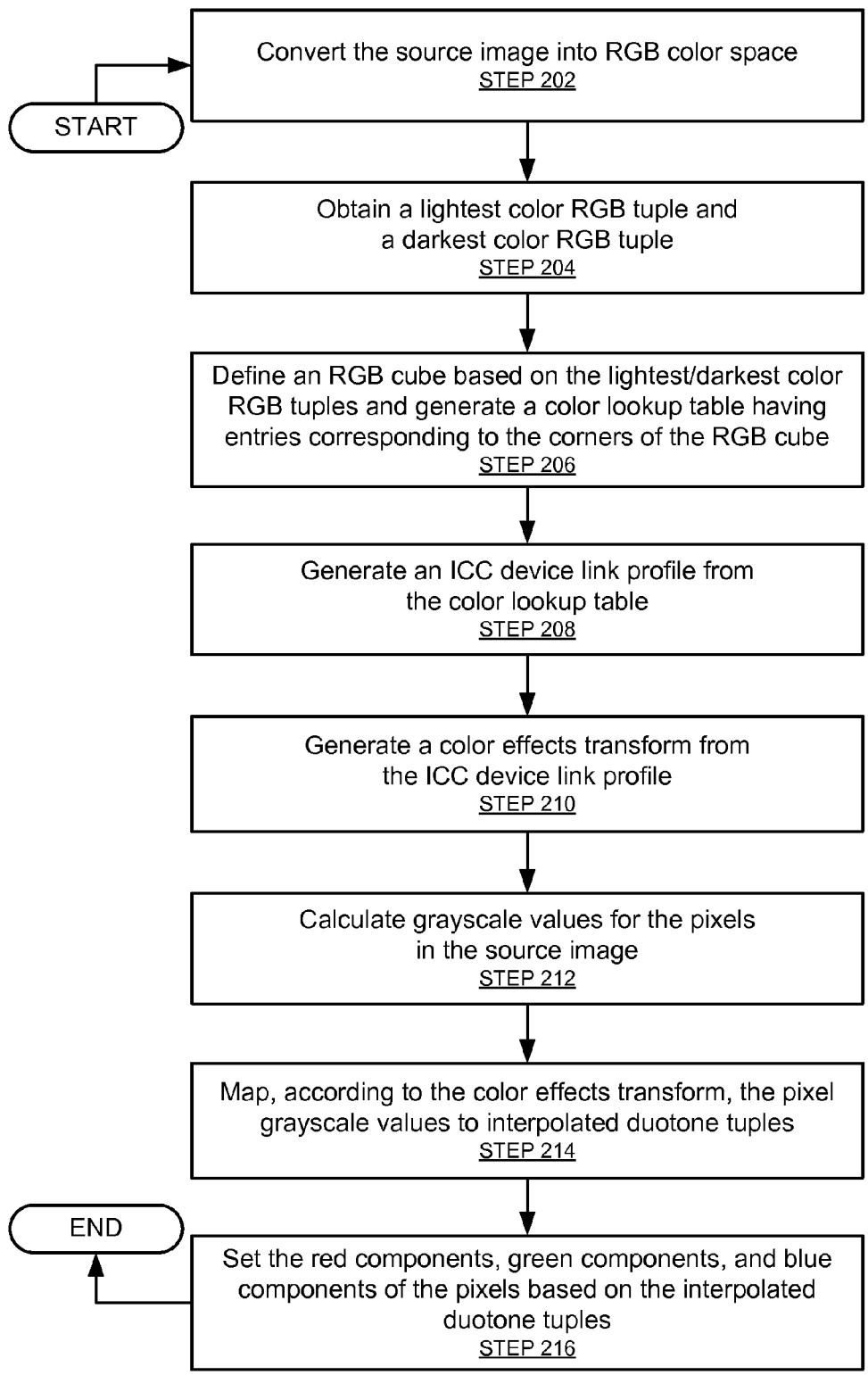
FIG. 2 shows a flowchart in accordance with one or more embodiments of the invention.

FIG. 2 shows a flowchart in accordance with one or more embodiments of the invention. The process shown in FIG. 2 may be used, for example, with the system (100), to create a duotone color effect. The sequence of steps shown in FIG. 2 may differ among embodiments of the invention, and one or more of the steps may be performed in parallel and/or may be optional. Accordingly, the scope of the invention should not be considered limited to the specific arrangement of steps shown in FIG. 2.

In STEP 202, a source image is converted into the RGB color space. The source image may be in an arbitrary color space, and is converted into the RGB color space using a color transformation. For example, the source image may be converted from the CMYK color space into the RGB color space. Those skilled in the art, having the benefit of this detailed description will appreciate that STEP 202 may be omitted if the source image is already in the RGB color space.

In STEP 204, the RGB tuples of the lightest color and the darkest color for the duotone color effect are obtained. The lightest color and the darkest color may be obtained from a user. In other words, the lightest color and the darkest color for the duotone color effect are selected by the user.

In STEP 206, a RGB cube is defined. As discussed above, colors in the RGB space are defined by three components (R, G, B). Accordingly, RGB tuples may be plotted by treating the RGB component values as ordinary Cartesian coordinates. In one or more embodiments of the invention, a RGB cube may be defined based on the lightest color RGB tuple and the darkest color RGB tuple selected by the user for the duotone effect. Specifically, the darkest color RGB tuple and the lightest color RGB tuple may define opposite corners of the RGB cube separated by the space diagonal of the RGB cube.

In one or more embodiments of the invention, a color lookup table is generated from the RGB cube. For example, assume (r1, g1, b1) is the lightest color RGB tuple and (r0, g0, b0) is the darkest RGB tuple. The color lookup table (106) may include the following data points: lutTable[0]=r0; lutTable[1]=g0; lutTable[2]=b0; lutTable[3]=r0; lutTable[4]=g0; lutTable[5]=b1; lutTable[6]=r0; lutTable[7]=g1; lutTable[8]=b0; lutTable[9]=r0; lutTable[10]=g1; lutTable[11]=b1; lutTable[12]=r1; lutTable[13]=g0; lutTable[14]=b0; lutTable[15]=r1; lutTable[16]=g0; lutTable[17]=b1; lutTable[18]=r1; lutTable[19]=g1; lutTable[20]=b0; lutTable[21]=r1; lutTable[22]=g1; lutTable[23]=b1. The color lookup table may contain 8 entries of 3 bytes apiece, one point for each corner of the RGB cube.

In STEP 208, an ICC device link profile is generated from the color lookup table. Those skilled in the art, having the benefit of this detailed description, will appreciate that the ICC device link profile may include a 3×3 matrix, N curves, an N×M lookup table, and M curves. However, the 3×3 matrix, the N curves, and the M curves will be unity. The N×M lookup table will include values based on the color lookup table.

In STEP 210, a color effects transform is generated from the ICC device link profile. The color effects transform maps a grayscale value to a duotone RGB tuple interpolated from the lightest color RGB tuple and the darkest color RGB tuple. In other words, the color effects transform maps a pixel's RGB grayscale tuple (Y,Y,Y) to an interpolated RGB duotone tuple (R', G', B'). For example, the duotone RGB tuple may be a weighted average of the lightest color RGB tuple and the darkest color RGB tuple, where the weights are based on the grayscale value. Those skilled in the art, having the benefit of this detailed description, will appreciate that there exists many algorithms to interpolate the duotone RGB tuple (R', G', B') based on the input grayscale value and the RGB tuples of the lightest and darkest colors.

In STEP 212, grayscale values are generated for the pixels in the source image. For example, the formula Y=(0.3*R)+(0.59*G)+(0.11*B) may be used to generate the grayscale value (Y) for a pixel, where R, G, and B are the red, blue, and green components of the pixel. Those skilled in the art will appreciate that there may be many other transformations for generating grayscale values from RGB image data. The RGB tuple defining the pixel may be set to (Y,Y,Y). In other words, each of the components of the RGB tuple may be set to the grayscale value, effectively forming an RGB grayscale tuple.

In STEP 214, the pixel grayscale values are mapped, according to the color effects transform, to interpolated RGB duotone tuples. In other words, the RGB grayscale tuple (Y,Y,Y) may be mapped to (R', G', B'). In STEP 216, the red, green, and blue components of the pixels are set to R', G', and B' respectively. In one or more embodiments of the invention, STEP 214 and/or STEP 216 may be performed by a color conversion algorithm. In such embodiments, the color conversion algorithm inputs the ICC device link profile and RGB grayscale tuples (e.g., (Y, Y, Y)) for the pixels in the source image, and outputs the interpolated duotone RGB tuples of the pixels of the duotone image.

Figure 3:
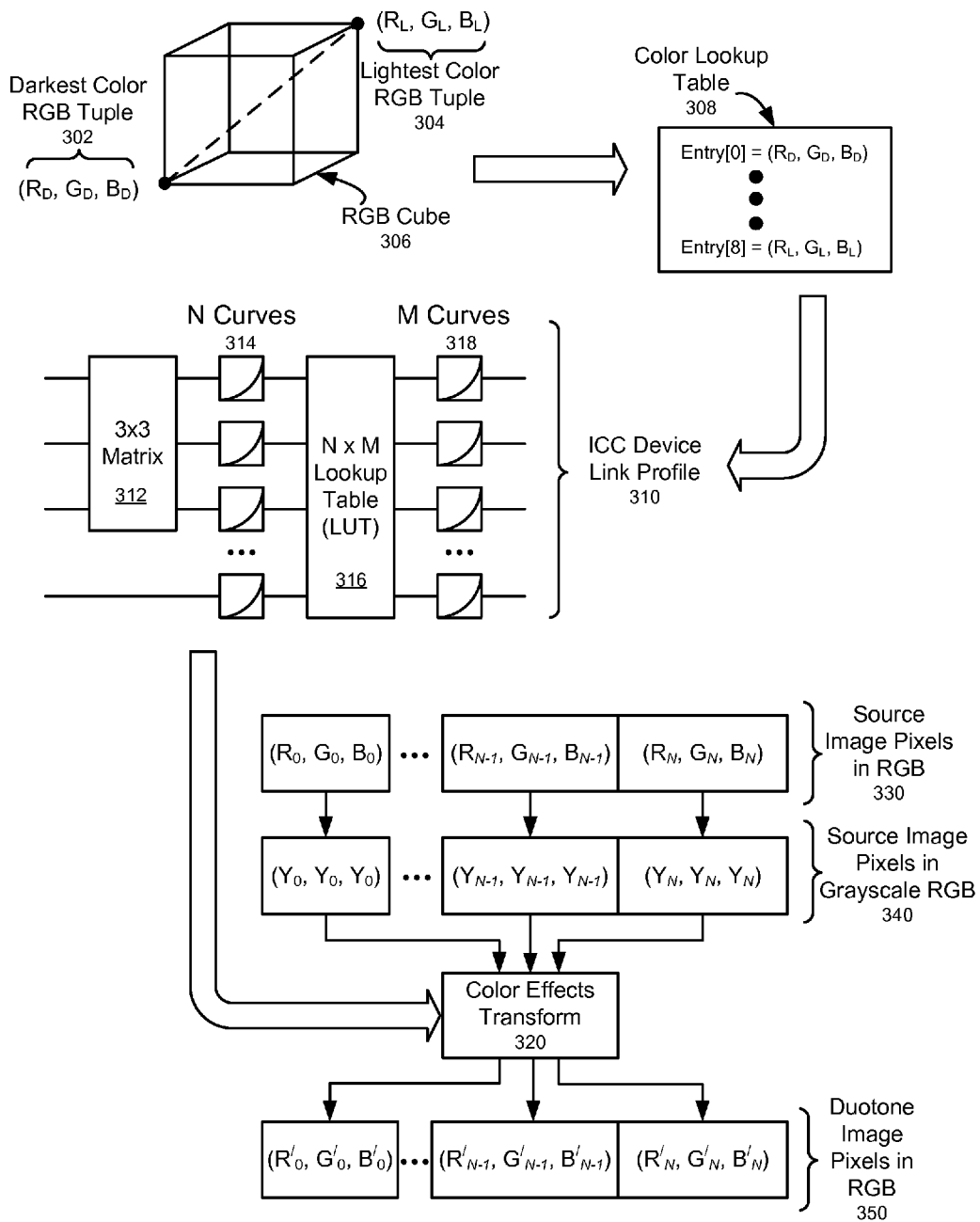
FIG. 3 shows an example in accordance with one or more embodiments of the invention.

FIG. 3 shows an example in accordance with one or more embodiments of the invention. The example shown in FIG. 3 may be used, for example, with the system (100), to create a duotone color effect. The sequence of steps and/or elements shown in FIG. 3 may differ among embodiments of the invention, and one or more of the steps may be performed in parallel and/or may be optional.

In FIG. 3, an RGB cube (306) is defined according to the darkest color RGB tuple ($R_D$, $G_D$, $B_D$) (302) and the lightest color RGB tuple ($R_L$, $G_L$, $B_L$) (304) selected by a user. These tuples define opposing corners of the RGB color cube (306) separated by the space diagonal.

Subsequently, a color lookup table (308) is generated based on the RGB cube (306). Specifically, the color lookup table (308) has one entry for each corner of the RGB cube (306), and each entry has three bytes for the red, green, and blue components of the RGB tuple of the corner.

Then, the ICC device link profile (310) is generated using the color lookup table (308). The ICC device link profile (310) represents a color transformation. The ICC device link profile (310) may contain various elements, including a 3×3 matrix (312), a set of one-dimensional N curves (314), a multi-dimensional N×M lookup table (LUT) (316), and a set of one-dimensional M curves (318). Image data may be processed using these elements in the following sequence: image input→3×3 matrix (312)→N curves (314)→N×M LUT (316) →M curves (318) (i.e., output). Certain of these elements may be set to identity transforms. For example, the 3×3 matrix (312), the N curves (314), and the M curves (318) may be set to identity transforms. In this scenario, the N×M LUT (316) is effectively used to perform the color transformation.

Next, the source image pixels in the RGB color space (330) are converted to source image pixels in the grayscale RGB color space (340). Specifically, each RGB tuple is converted to a grayscale RGB tuple (e.g, ($Y_0$, $Y_0$, $Y_0$), ($Y_N$, $Y_N$, $Y_N$)). After this transform, each red, green, and blue component of a source image pixel has the same grayscale value. This conversion may be performed using the formula Y=(0.3*R)+(0.59*G)+(0.11*B), where Y is the resulting grayscale value. Those skilled in the art will appreciate that other methods to convert color image data to grayscale may also be used.

Next, the RGB grayscale tuple is converted/mapped to an interpolated RGB duotone tuple (350) using the color effects transform (320). This process may be executed by an ICC color conversion algorithm. For example, RGB grayscale tuple $(Y_0, Y_0, Y_0)$ is mapped to duotone tuple $(R_0', G_0', B_0')$. Similarly, RGB grayscale tuple $(Y_N, Y_N, Y_N)$ is mapped to duotone tuple $(R_N', G_N', B_N')$. Once all the RGB grayscale tuples have been mapped, the resulting RGB duotone image may be optionally be converted to the final destination color space (e.g., CMYK).

Embodiments of the invention have one or more of the following advantages: the ability to implement a duotone effect; the ability to implement a duotone effect using an ICC color conversion algorithm; the ability to generate an ICC device link profile based on the lightest color and the darkest color specified by the user for the duotone image; the ability to repeatedly use an ICC device link profile to convert a source image to a duotone image, etc.

Figure 4:
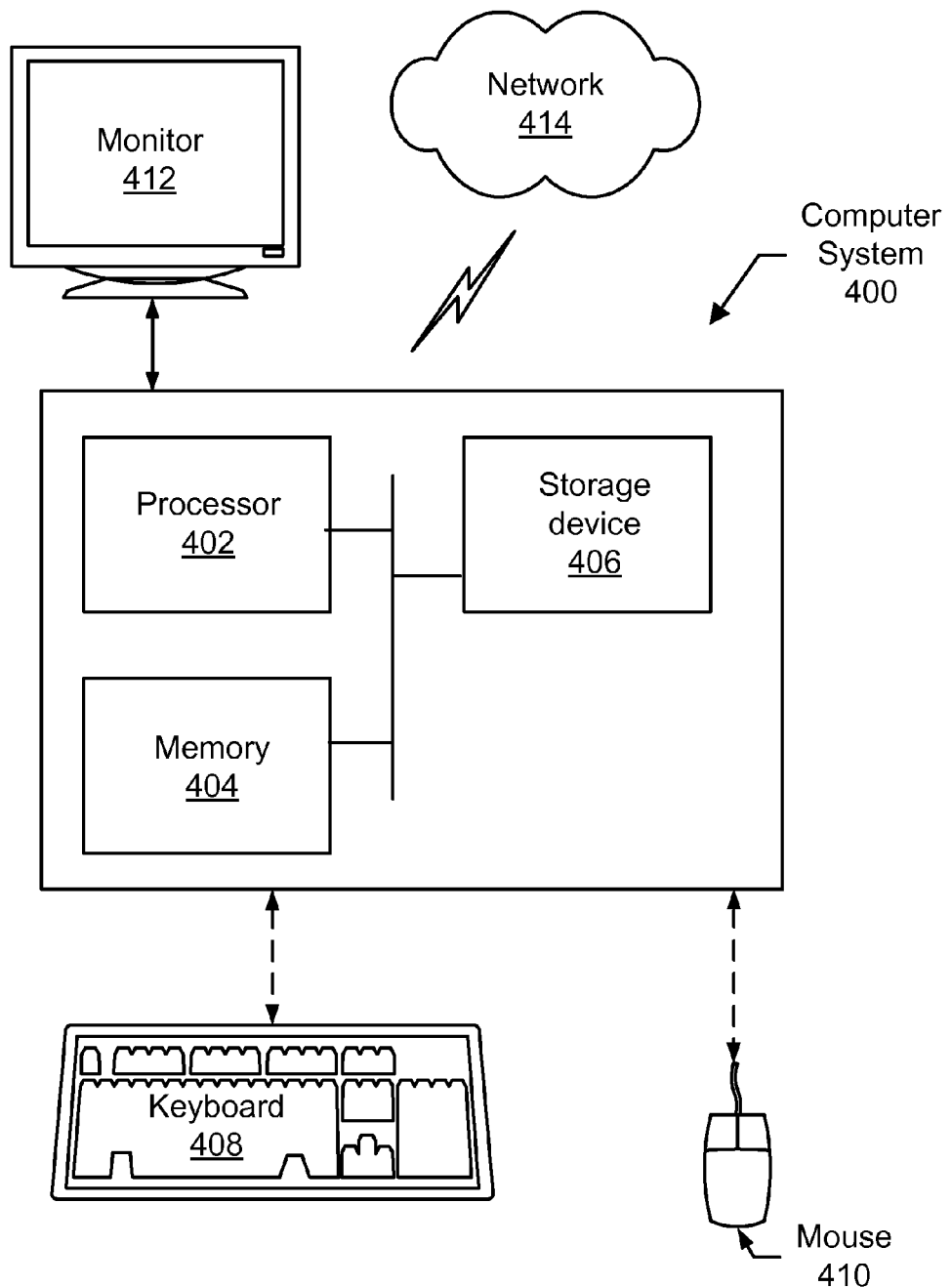
FIG. 4 shows a computer system in accordance with one or more embodiments of the invention.

Embodiments of the invention may be implemented on virtually any type of computer regardless of the platform being used. For example, as shown in FIG. 4, the computer system (400) includes one or more processor(s) (402), associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. conversion engine, format module, buffer, color lookup table, color profile module) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a duotone color effect from a lightest color and a darkest color, comprising:
    obtaining, by a processor, a source image in a red-green-blue (RGB) color space;
    obtaining, by the processor, a lightest color RGB tuple and a darkest color RGB tuple;
    generating, by the processor, an international color consortium (ICC) device link profile based on the lightest color RGB tuple and the darkest color RGB tuple; and
    converting, by the processor, the source image in RGB color space to a duotone image in RGB color space using a color conversion function with the ICC device link profile.

2. The method of claim 1, wherein generating the ICC link profile comprises:
    defining a RGB cube comprising a plurality of corners including a first corner at the lightest color RGB tuple and a second corner at the darkest color RGB tuple,
    wherein the RGB cube comprises a space diagonal connecting the first corner and the second corner; and
    generating a color lookup table comprising a plurality of entries corresponding to the plurality of corners of the RGB cube.

3. The method of claim 1, wherein converting the source image comprises:
    calculating a grayscale value for a pixel of the source image in RGB color space;
    generating a color effects transform from the ICC device link profile;
    mapping, using the color effects transform, the grayscale value to a duotone RGB tuple interpolated from the lightest color RGB tuple and the darkest color RGB tuple; and
    setting a red component, a green component, and a blue component of the pixel according to the duotone RGB tuple.

4. The method of claim 3, wherein the duotone RGB tuple is a weighted average of the lightest color RGB tuple and the darkest color RGB tuple based on the grayscale value.

5. The method of claim 3, further comprising:
    setting the red component, the green component, and the blue component of the pixel to the grayscale value before mapping the grayscale value.

6. The method of claim 1, further comprising:
    converting the source image from an arbitrary color space to the RGB color space; and
    converting the duotone image from the RGB color space to the arbitrary color space.

7. The method of claim 1, wherein the darkest color is a first arbitrary color and the lightest color is a second arbitrary color.

8. A non-transitory computer readable medium (CRM) storing instructions for creating a duotone color effect from a lightest color and a darkest color, the instructions comprising functionality for:
    obtaining a source image in a red-green-blue (RGB) color space;
    obtaining a lightest color RGB tuple and a darkest color RGB tuple;
    generating an international color consortium (ICC) device link profile based on the lightest color RGB tuple and the darkest color RGB tuple; and
    converting the source image in RGB color space to a duotone image in RGB color space using a color conversion function with the ICC device link profile.

9. The non-transitory CRM of claim 8, wherein the instructions for generating the ICC link profile further comprise functionality for:
   defining a RGB cube comprising a plurality of corners including a first corner at the lightest color RGB tuple and a second corner at the darkest color RGB tuple,
   wherein the RGB cube comprises a space diagonal connecting the first corner and the second corner; and
   generating a color lookup table comprising a plurality of entries corresponding to the plurality of corners of the RGB cube.

10. The non-transitory CRM of claim 8, wherein the instructions for converting the source image further comprise functionality for:
   calculating a grayscale value for a pixel of the source image in RGB color space;
   generating a color effects transform from the ICC device link profile;
   mapping, using the effect color transform, the grayscale value to a duotone RGB tuple interpolated from the lightest color RGB tuple and the darkest color RGB tuple; and
   setting a red component, a green component, and a blue component of the pixel according to the duotone RGB tuple.

11. The non-transitory CRM of claim 10, wherein the duotone RGB tuple is a weighted average of the lightest color RGB tuple and the darkest color RGB tuple based on the grayscale value.

12. The non-transitory CRM of claim 10, the instructions further comprising functionality for:
   setting the red component, the green component, and the blue component of the pixel to the grayscale value before mapping the grayscale value.

13. The non-transitory CRM of claim 8, the instructions further comprising functionality for:
   converting the source image from an arbitrary color space to the RGB color space; and
   converting the duotone image from RGB color space to the arbitrary color space.

14. The non-transitory CRM of claim 8, wherein the darkest color is blue and the lightest color is white.

15. A system for creating a duotone color effect from a lightest color red-green-blue (RGB) tuple and a darkest color RGB tuple, comprising:
   a processor;
   a buffer for storing a portion of a source image in a RGB color space;
   a color profile module executing on the processor and configured to generate an international color consortium (ICC) device link profile based on the lightest color RGB tuple and the darkest color RGB tuple; and
   a conversion engine executing on the processor and comprising a color converter configured to convert the portion in the buffer to a duotone image in RGB color space using a color effects transform generated from the ICC device link profile.

16. The system of claim 15, further comprising:
   a color lookup table comprising a plurality of entries corresponding to a plurality of corners of an RGB cube,
   wherein the plurality of corners comprises a first corner at the lightest color RGB tuple and a second corner at the darkest color RGB tuple,
   wherein the RGB cube comprises a space diagonal connecting the first corner and the second corner, and
   wherein the ICC device link profile is generated based on the color lookup table.

17. The system of claim 15, wherein the conversion engine further comprises:
   a grayscale converter configured to calculate a grayscale value for a pixel in the portion of the source image,
   wherein the color effects transform maps the grayscale value to a duotone RGB tuple interpolated from the lightest color RGB tuple and the darkest color RGB tuple.

18. The system of claim 17, wherein the conversion engine is configured to:
   set a red component, a green component, and a blue component of the pixel based on the duotone RGB tuple.

19. The system of claim 15, wherein the conversion engine further comprises:
   a transform generator configured to generate the color effects transform from the ICC device link profile.

20. The system of claim 15, further comprising:
   a format module configured to:
      convert the source image from an arbitrary color space to the RGB color space; and
      convert the duotone image from RGB color space to the arbitrary color space.

\* \* \* \* \*